United States Patent [19]

Takei et al.

[11] Patent Number: 5,618,654
[45] Date of Patent: Apr. 8, 1997

[54] PHOTO-CONTROLLED SPATIAL LIGHT MODULATOR

[75] Inventors: Hiroyuki Takei, Saitama-ken; Norio Shimizu, Sayama, both of Japan

[73] Assignee: Hitachi, Ltd., Tokyo, Japan

[21] Appl. No.: 168,171

[22] Filed: Dec. 17, 1993

[30] Foreign Application Priority Data

Dec. 24, 1992 [JP] Japan .................................. 4-343809
Jun. 10, 1993 [JP] Japan .................................. 5-138156

[51] Int. Cl.$^6$ .................................................. G02F 1/01
[52] U.S. Cl. ................... 430/347; 430/495.1; 430/962; 359/240; 359/241; 359/244; 359/260
[58] Field of Search ................... 359/265, 270, 359/273, 253, 241, 244, 240, 260; 430/347, 495.1, 962

[56] References Cited

U.S. PATENT DOCUMENTS

| | | | |
|---|---|---|---|
| 4,834,511 | 5/1989 | Bennion et al. | 359/241 |
| 5,346,789 | 9/1994 | Lewis et al. | 430/19 |

FOREIGN PATENT DOCUMENTS 63-231424  9/1988  Japan .

OTHER PUBLICATIONS

*Biophys. J.* entitled "Surface–Induced Lamellar Orientation of Multilayer Membrane Arrays" by N. Clark, K. Rothschild, D Luippold and B. Simon, vol. 31, Jul. 1980, pp .65–96.
*Encyclopedia of Lasers and Optical Technology* by R. Heyers, Ed. Academic Press, Inc., 1991, pp. 397–400.
*Quarterly Reviews of Biophysics* entitled "Bacteriorhodopsin: a biological material for information processing", 24, 4 (1991), pp. 425–478.
"Biopolymers for Real–Time Optical Processing", Bazhenov et al. pp. 103–144 (1989).

*Primary Examiner*—John A. McPherson
*Attorney, Agent, or Firm*—Evenson, McKeown, Edwards & Lenahan, P.L.L.C.

[57] ABSTRACT

A rhodopsin family protein is inserted into an etalon type cavity having partially reflecting mirrors as principal components having a reflectivity of 50% to less than 100% for light having a wavelength in the 650–800 nm region and a transmissivity of 30% or more for light having a wavelength in the 400–600 nm region to form a photo-controlled spatial modulator. By utilizing a change in the refractive index by light of the photo-sensitive protein, near infrared light of a stronger intensity can be controlled by weaker visible light, and the information contained in the light signal on a two-dimension plane can be rapidly controlled by a light signal of weaker intensity of another two-dimension plane by using an optical switch of a simple construction.

4 Claims, 4 Drawing Sheets

PHOTO-CONTROLLED SPATIAL LIGHT MODULATOR

BACKGROUND OF THE INVENTION

1. Field of the Invention

The present invention relates to a photo-controlled spatial light modulator, and more particularly to a spatial light modulator, of an etalon type, which controls transmission to a longer wavelength light in a near infrared region by a shorter wavelength light in a visible region on a two-dimension plane and a method for manufacturing a bacteriorhodopsin thin film having an optical characteristic suitable for use in the modulator.

2. Description of the Related Art

As a photo-sensitive functional material to be used for a photo-controlled spatial light modulator having an etalon type cavity structure, organic photo-chromic materials represented by spiropyran, azobenzene, fulgide and cyclopfane, and a superlattice semiconductor having an photo-induced Stark effect have been proposed. Those materials utilize the change in an absorption coefficient or a refractive index by the light irradiation.

SUMMARY OF THE INVENTION

The photo-controlled spatial light modulator includes control light for controlling the modulator and light to be modulated which is controlled by the modulator. When the change in the absorption coefficient of the photochromic material by the light irradiation is utilized in the photo-controlled spatial light modulator, it is currently only possible to control weak light to be modulated by strong control light because the light to be modulated also affects to the absorption coefficient. In addition, repetition durability of those organic materials is less than 1000 times and they are easily oxidized. Accordingly, they have a problem in the stability.

On the other hand, the intensity of the control light required for exploitation of the non-linear optical characteristic possessed by the superlattice semiconductor is in the order of mega watts (MW)/cm$^2$. Accordingly, heat is generated and it is not appropriate for the application to the spatial light modulator.

It is an object of the present invention to provide a photo-controlled spatial light modulator which has high repetition durability (more than 1 million times) and allows to control a stronger signal to be modulated with a weaker control light signal (lower than 1 W/cm$^2$).

In order to improve the characteristic of the photo-controlled spatial light modulator, it is effective to utilize an optical property that a refractive index, particularly in the near infrared region, is changed by irradiating bacteriorhodopsin with visible light. In order to effectively utilize this property, it is necessary to suppress scattering of the bacteriorhodopsin thin film as much as possible. However, since the prior art method does not pay attention on this point, it cannot suppress scattering. Further, where it is dispersed in a polymer, aggregation occurs unless the concentration of bacteriorhodopsin is kept low and it is not possible to form an optically dense film of uniform property.

It is another object of the present invention to provide a method for forming a bacteriorhodopsin thin film which is suitable as an optical material.

DESCRIPTION OF THE PREFERRED EMBODIMENTS

The rhodopsin family protein to be used in the present invention includes rhodopsin which is present in retina which controls the visual sense of a living body, and bacteriorhodopsin which is present in the cell wall of Halobacterium halobium which is a kind of highly halophilic bacteria. Of the rhodopsin family chemically modified proteins or mutated proteins formed by using a technique of gene engineering can be used. Those photo-sensitive proteins have a peak absorption value in the wavelength region of 300–800 nm. When it absorbs light, photo intermediates characterized by different absorption spectra are formed in the order of pico second to milli second and the refractive index spectrum thereof is changed.

Figure 1:
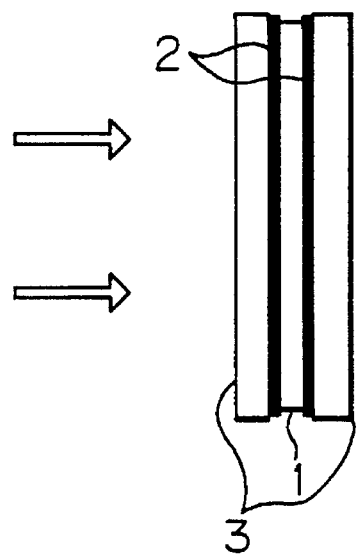
FIG. 1 shows a basic configuration of the photo-controlled spatial modulator of the present invention.

The above object is attained by inserting the rhodopsin protein into an etalon type cavity as shown in FIG. 1. The etalon type cavity is constructed by holding a rhodopsin protein film 1 between glass etalons having partially reflecting mirrors 2 on surfaces thereof. When near infrared light having a wavelength of λir is irradiated normally to the surface of the film 1, the transmission of the cavity is effectively 100% when the following relation is met.

$$L = N\lambda_{ir}/2n$$

where L is the spacing of the partially reflecting mirrors, N is an integer, λir is the wavelength of the irradiated light, and n is the refractive index of the rhodopsin to the light having the wavelength λir.

When λir and L are constant, the transmission may be changed if n is variable. In the present invention, the above object is attained by irradiating the rhodopsin protein by visible light. The protein preferably has a transmission close to 100% for the light having the wavelength λir and the partially reflecting mirrors which are a principal component of the cavity preferably have a reflectivity of 50% or more to the same wavelength. Since visible light having the wavelength of λv is irradiated to the protein to induce the photo-chemical reaction, the partially reflecting mirror preferably has a transmission of 30% or more to the light having the wavelength λv.

The protein to be inserted in the cavity is of film form, and a dry thin film may be coated with transparent polymer for reinforcement, or it may be dispersed into the transparent polymer. The thickness is preferably 10 μm to 10 mm. It is important to suppress scattering as much as possible. The material of the partially reflecting mirror may be a metal such as gold and aluminum, or a dielectric multi layer, and has a transmission of more than 30% to the wavelength of the control light and a reflectivity of 50%–99% to the light to be modulated.

Figure 2:
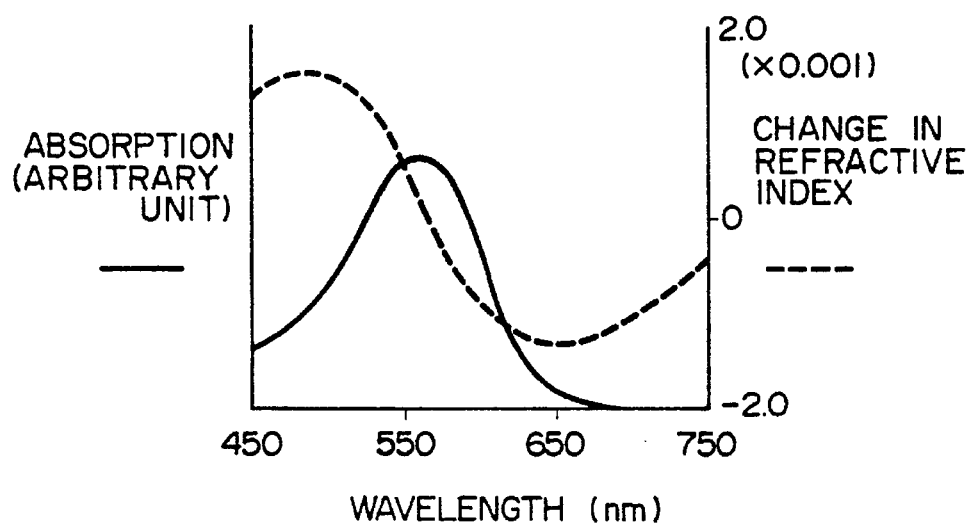
FIG. 2 shows a graph of the absorption spectrum of the bR state of bacteriorhodopsin protein which is used in the photo-controlled spatial modulator of the present invention, and a change in the refractive index accompanying the formation of M intermediate.

The bacteriorhodopsin protein which is one of the rhodopsin family proteins to be used in the present invention is stable in a state called the bR state having a peak absorption value at a wavelength of 568 nm, and the photo reaction is initiated by the irradiation of green light. After a number of photo intermediates are sequentially produced, it returns to the bR state in several tens of ms. Each photointermediate is characterized by an absorption spectrum which is different from that of the bR state and has a different refractive index spectrum. What is most interesting for the above optical characteristic is the 650–700 nm wavelength region as shown in FIG. 2. In this region, the absorption spectrum of the bR state is effectively 0%, and the change in the refractive index due to the generation of the M intermediate having the absorption spectrum which is most different from that of the bR state is maximum. This effect appears most prominently under a condition in which the M intermediate can stably exist. Namely, the stability of the M intermidiate can be increased at reduced temperatures in the range of −90° to −20° C. or at the room temperature by chemical pre-treatment of the protein in a buffer solution having pH 10 or higher.

The bacteriorhodopsin suspension is produced in the following manner.

Halobacterium halobium was cultivated in a culture solution which contains amino acids, vitamins and 4M NaCl at 37° C. For the first four days, it was cultivated under aerobic conditions in a dark vibrating cultivation vessel, and for the remaining four days, it was cultivated under anaerobic conditions with illumination. On the eighth day, the bacteria were collected by 10,000×g centrifugation and DNase was added thereto. They were agitated and bacteriorhodopsin was extracted from the cell wall. When it was centrifuged at 50,000×g, bacteriorhodopsin precipitated to form a pellet. After the supernatant was removed, the pellet was redissolved into pure water to produce the bacteriorhodopsin suspension.

Where bacteriorhodopsin is used as a rhodopsin family protein, the characteristic required for the partially reflecting mirror is a reflectivity of 50% or more in the wavelength region of 650–800 nm and a transmission of 30% or more in the wavelength region of 350–630 nm.

Figure 3:
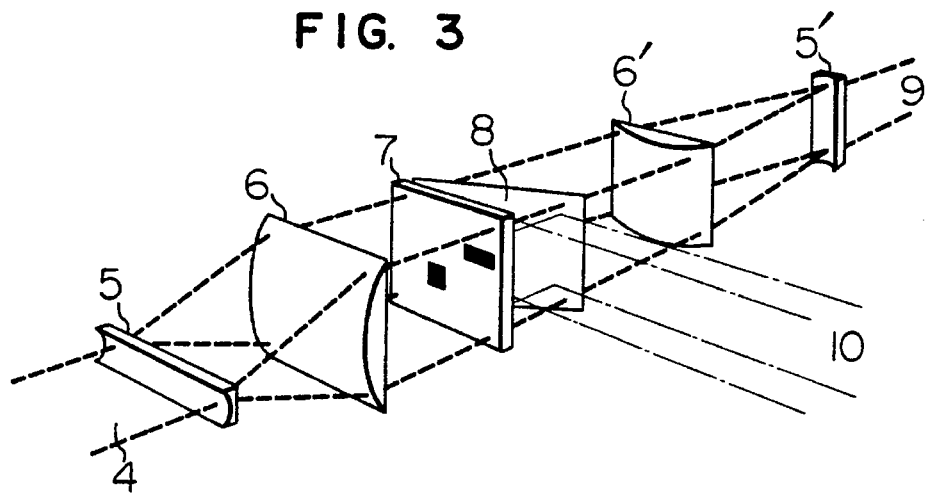
FIG. 3 shows an application of the photo-controlled spatial modulator of the present invention to an optical interconnect.

FIG. 3 shows an application of the photo-controlled spatial modulator to an optical interconnect. Purpose of the optical interconnect is to apply intensity modulation to light signals when the light signals emitted from light sources arranged in a linear array are transmitted to receivers arranged in another linear array. Where N light sources and N receivers are provided, a degree of freedom is maximum if the modulation is accomplished at $N^2$ points. In FIG. 3, light 4 to be modulated in the linear array form is converted to a two-dimension signal array by cylindrical plane lenses 5 and 6. This signal is intensity-modulated by a photo-controlled spatial modulator 7 and reconverted to a linear signal array by cylindrical lenses 6' and 5' to produce light 9 to be modulated. The intensity modulation depends on the state of the rhodopsin family protein in the modulator and it is accomplished by the control light input 10. The control light input 10 projected to the photo-controlled spatial modulator by a beam splitter 8 causes the photochemical reaction in the rhodopsin family protein and the extent of the intensity modulation is controlled by the presence and absence of the photochemical reaction.

A method for producing the thin film from the bacteriorhodopsin suspension is now explained although the present invention is not limited thereto.

EXAMPLE 1

To Produce the Bacteriorhodopsin Film

Figure 4:
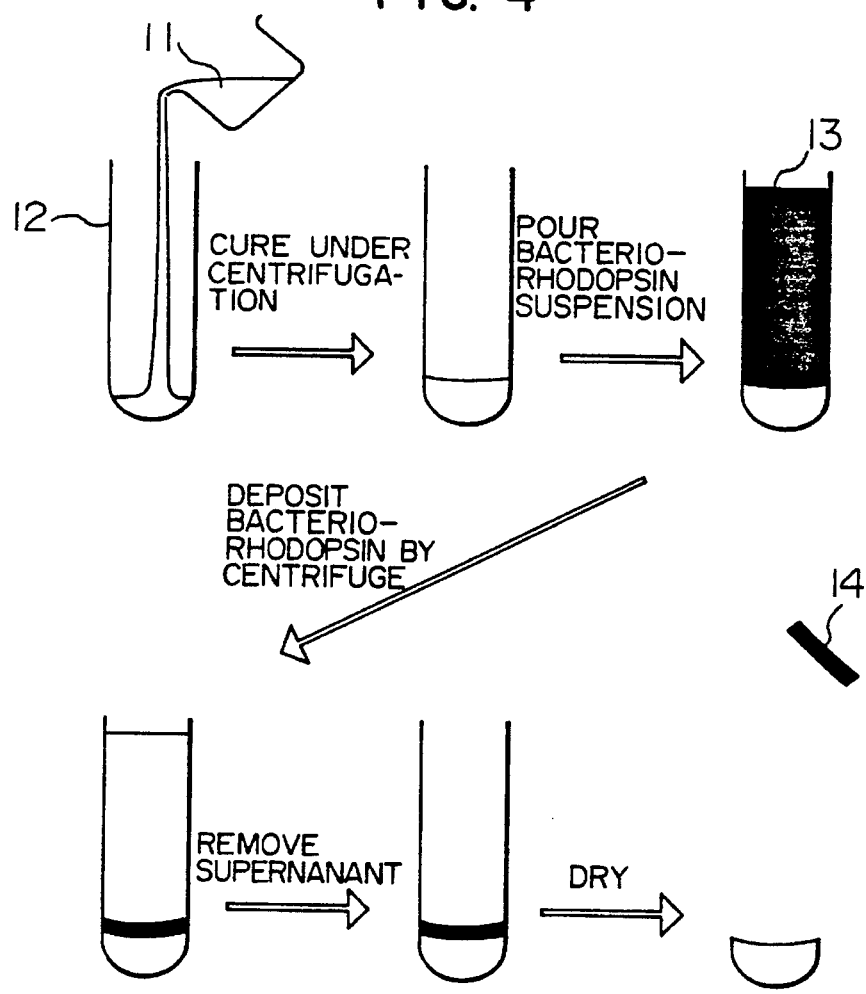
FIG. 4 shows a method for forming a bacteriorhodopsin thin film suitable for use in the photo-controlled spatial modulator of the present invention.

Referring to FIG. 4, as means for forming an isopotential surface in a centrifuge tube, liquid state silicone rubber 11 immediately after the addition of hardner was poured into a centrifuge tube 12 and it was cured under the centrifugal force of 5,000×g. Then, the bacteriorhodopsin suspension 13 was poured into the centrifuge tube 12 having the isopotential surface formed by the cured silicone rubber 11. For 1 $cm^2$ surface area, approximately 6 mg of bacteriorhodopsin resulted in a thin film of 50 μm thickness.

In depositing bacteriorhodopsin on the isopotential surface of the centrifugal tube 12, it was subjected to centrifugation of 20,000×g or more for 30 minutes. After centrifugation, uniform bacteriorhodopsin was deposited on the isopotential surface and the supernatant was removed with care not to disturb the film. The deposited film was dried at a room temperature and a relative humidity of 80% or more. The dried film was brittle but the bacteriorhodopsin thin film 14 could be lifted off from the isopotential surface without cracking by providing a local air gap between the film and the isopotential surface by making use of the elasticity of the silicone isopotential surface.

Figure 5:
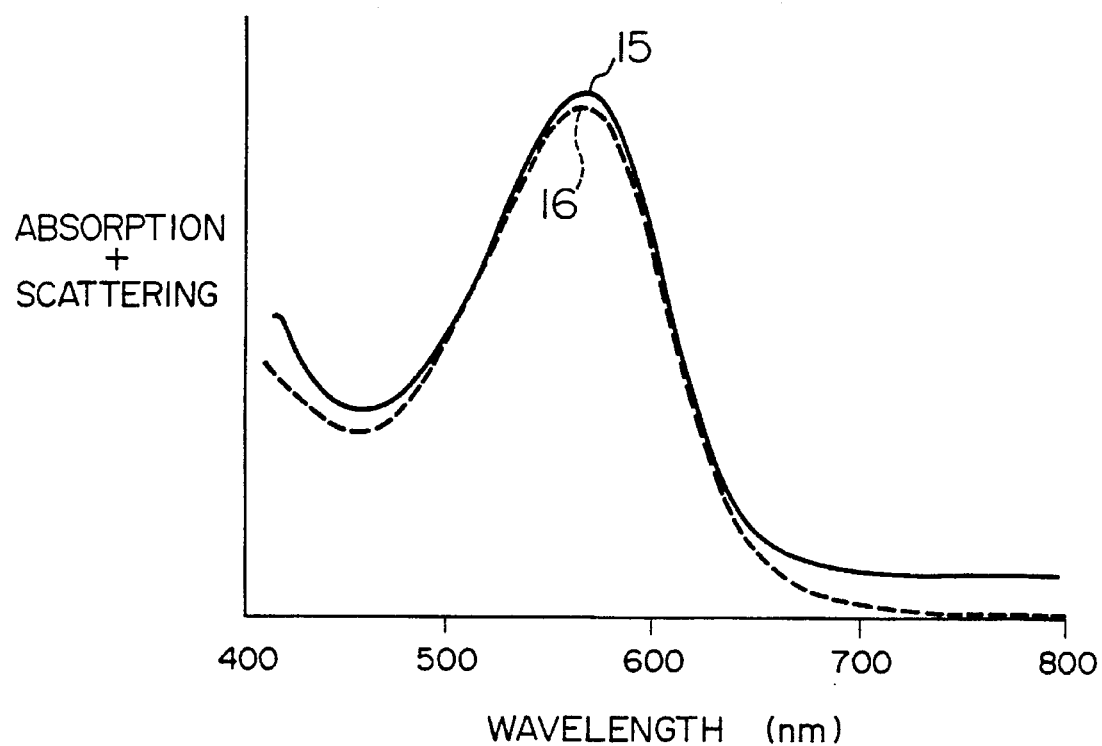
FIG. 5 shows an optical characteristic of absorption+ scattering of the bacteriorhodopsin thin film and bacteriorhodopsin suspension in an example 1.

FIG. 5 shows an optical characteristic 16 of the absorption+scattering of the bacteriorhodopsin thin film, and an optical characteristic 15 of the absorption+scattering of the bacteriorhodopsin suspension. As seen from FIG. 5, the characteristic of the bacteriorhodopsin thin film in the present example is better than the characteristic of the absorption+scattering of the bacteriorhodopsin suspension so that the bacteriorhodopsin thin film which exhibits low absorption and low scattering in the near infrared region can be formed.

EXAMPLE 2

Of Method for Forming the Bacteriorodopsin Film

Figures 6A, 6B, 6C:
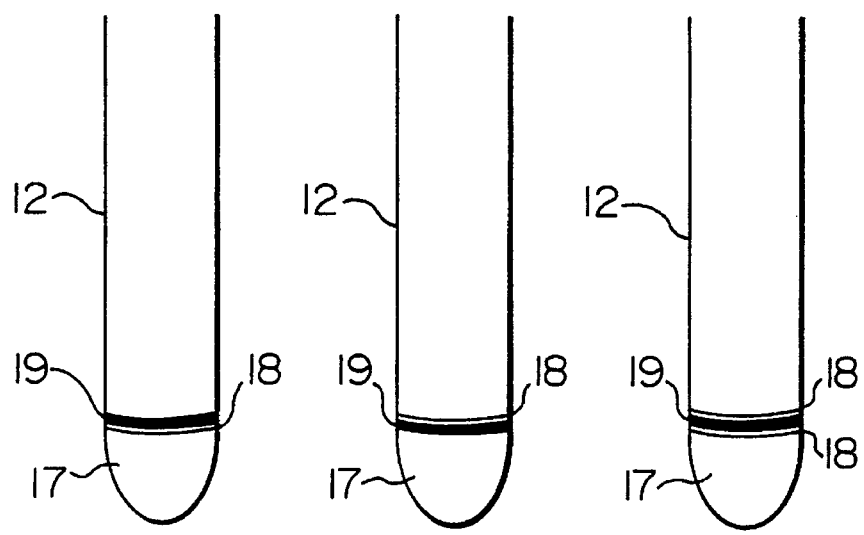
FIGS. 6A, 6B and 6C show an example 2 of the method for forming the bacteriorhodopsin thin film in which the bacteriorhodopsin thin film is reinforced by a transparent substrate.

Referring to FIG. 6A, an isopotential surface of a cured silicone rubber 17 was formed in the centrifuge tube 12. Then, several drops of cyano-acrylate were placed on the isopotential surface and it was subjected to centrifugation of 20,000×g while curing. Thus, a transparent substrate 18 of a uniform thickness was formed on the silicone isopotential surface. Bacteriorhodopsin suspension 13 was poured into the centrifuge tube 12. For 1 $cm^2$ surface area, approximately 6 mg of bacteriorhodopsin resulted in a thin film of 50 μm thickness.

In depositing bacteriorhodopsin onto the isopotential surface of the centrifuge tube, it was subjected to centrifugation of 20,000×g or more. After centrifugation, uniform bacteriorhodopsin was deposited onto the isopotential surface and the supernatant was removed with care not to disturb the film. The deposited film was dried at a room temperature and a relative humidity of 80% or more to produce the structure shown in FIG. 6A in which numeral 19 denotes a bacteriorhodopsin thin film, numeral 18 denotes a transparent substrate, and numeral 17 denotes a cured silicone rubber. The transparent substrate 18 was lifted off from the cured silicone rubber 17 to produce a dry bacteriorhodopsin thin film 19 reinforced with cyanoacrylate.

The formation of the cyanoacrylate thin film 18 is not necessarily performed before the formation of the bacteriorhodopsin thin film as described above but it may be performed after the formation of the bacteriorhodopsin thin film 19 as shown in FIG. 6B. Further, it may be conducted before and after the formation of the bacteriorhodopsin thin film as shown in FIG. 6C. In any case, the dry bacteriorhodopsin thin film 19 mechanically reinforced by cyanoacrylate is produced. Since the transparency of cyanoacrylate is high, the optical characteristic of the bacteriorhodopsin thin film is not degraded.

EXAMPLE 3

Of the Method for Forming the Bacteriorhodopsin Film

The formation of the bacteriorhodopsin film and the manufacturing of the cavity were conducted in the following manner.

Polyvinyl alcohol having a molecular weight of 40,000 kDa was dissolved in a 50 mM HEPES buffer solution at 98° C. After the temperature of the polyvinyl alcohol was lowered to a room temperature, 0.5 mg of bacteriorhodopsin per 1 ml was added. Several ml of the mixture of polyvinyl alcohol and bacteriorhodopsin was held between glass etalons and it was cured in 24 hours. Then, the glass etalons were removed.

EXAMPLE 4

Of the Method for Forming the Bacteriorhodopsin Thin Film

An example 4 for forming the bacteriorhodopsin thin film is now explained. As shown in FIG. 4, bacteriorhodopsin suspension was poured into the centrifuge tube 12 having the isopotential surface of the silicone rubber formed thereon. For 1 $cm^2$ surface area, approximately 6 mg of bacteriorhodopsin resulted in a thin film of 50 μm thickness.

In depositing bacteriorhodopsin on the isopotential surface of the centrifuge tube 12, it was subjected to the centrifugation of 20,000×g or more for 30 minutes. After centrifugation, uniform bacteriorhodopsin was deposited onto the isopotential surface and the supernatant was removed with care not to disturb the film. The deposited bacteriorhodopsin film was taken out of the centrifuge tube 12 together with the silicone rubber 25 and the deposited film was dried at a room temperature. Before the film was well dried, the film was reinforced by a polymer in the following manner.

Figure 7A:
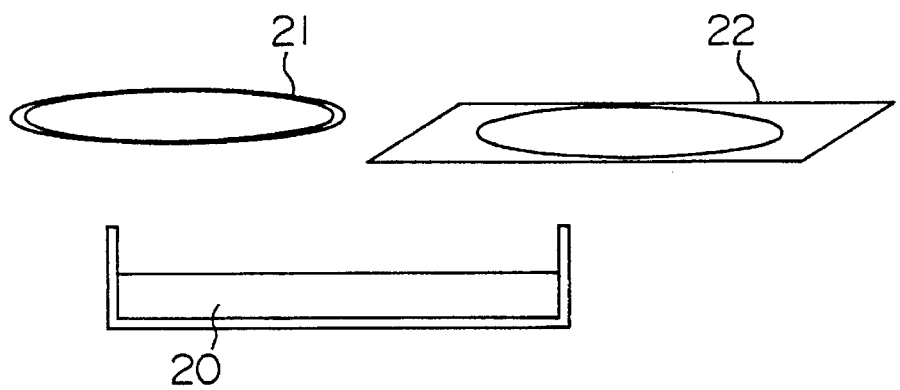
FIGS. 7A, 7B, 7C and 7D show an example 4 for forming the bacteriorhodopsin thin film reinforced with a polymer.
Figure 7B:
Figure 7C:
Figure 7D:
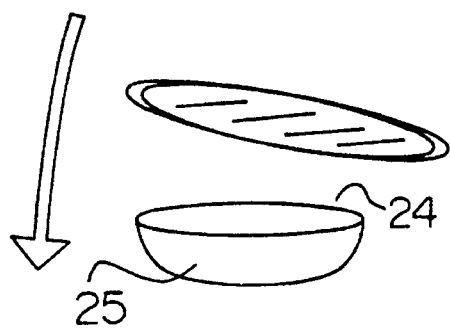

As the polymer, polyvinyl alcohol was used although other aqueous polymers may be used. 50–200 mg of polyvinyl alcohol was added to water per 1 $cm^3$ of the solvent to produce a polyvinyl alcohol solution. As shown in FIG. 7A, a ring 21 having an inner radius of 5–50 mm or a thin plate 22 having an circular aperture of 5–50 mm radius is prepared and it was dipped into the polyvinyl alcohol solution 20 as shown in FIG. 7B. The ring or the apertured thin plate was pulled up from the solution with care to form a circular polyvinyl alcohol thin film 23 having a radius of 5–50 mm as shown in FIG. 7C. Immediately after the formation of the polyvinyl alcohol thin film 23, it was fluid and water flow was observed on the surface, but the flow stopped as the water evaporated. The polyvinyl alcohol film 23 of this state was deposited onto the bacteriorhodopsin thin film 24 as shown in FIG. 7D. In this case, it was important that the bacteriorhodopsin thin film was not dry, and the bacteriorhodopsin thin film immediately after the stop of the water flow on the thin film surface was used. After the bacteriorhodopsin thin film was covered with the polyvinyl alcohol thin film, it was well dried at a room temperature and lifted off from the silicone rubber 25.

In accordance with the present invention, the control of the information contained in the optical signal on the two-dimension plane by the information contained in the weaker optical signal on another two-dimension plane can be attained quickly by the optical switch with a simple construction. The effect of the present invention as the photo-controlled spatial modulator is eliminating need to divide the light to be modulated on the two-dimension plane into a predetermined number of pixels.

The present invention is applicable to an optical neuro network which requires the processing of the optical signal on the two-dimension plane and parallel information processing such as real time image processing.

Although the present invention has been described in detail, it should be understood that various changes, substitutions and alterations can be made hereto without departing from the spirit and scope of the present invention as defined by the appended claims.

What is claimed is:

1. A photo-controlled spatial modulator of a Fabry-Perot cavity construction having rhodopsin family protein inserted between two partially reflecting mirrors forming a two-dimension plane for coupling with a first light and a second light which are irradiated on a substantially same position on a surface of the mirrors, wherein a transmission of said partially reflecting mirrors is selected to be 30% or more for the first light and a reflectivity of said partially reflecting mirrors is selected to be 50% or more for the second light so that a refractive index for the second light of said protein is changed by an irradiation and an absorption of the first light and wherein the wavelength of the second light has a value in a wavelength region which is not substantially affected by absorption in the protein.

2. A photo-controlled spatial modulator according to claim 1, wherein the wavelength of the second light is longer wavelength light in a visible region.

3. A photo-controlled spatial modulator according to claim 1, wherein the intensity of the second light is set stronger than that of the first light.

4. A photo-controlled spatial modulator for controlling transmission to longer wavelength light in a near infrared region irradiated to a two-dimension plane constructed by inserting rhodopsin family protein between two partially reflecting mirrors which are principal components of an etalon cavity, by shorter wavelength light in a visible region irradiated to said two-dimension plane;

wherein when bacteriorhodopsin is used as the rhodopsin family protein in said cavity, a wavelength of a control light is in 350–630 nm region and light controlled by the cavity is a monochromatic light having a wavelength in 650–800 nm region;

wherein said partially reflecting mirrors are made of a material having a transmission of 30% or more to light having a wavelength in the 350–630 nm region and a reflectivity of 50% or more to light having a wavelength in the 650–800 nm region.

* * * * *